Nov. 15, 1955  W. C. CONKLING  2,723,752
RETAINER FOR PAN CLEANERS IN SIEVES
Filed April 24, 1951
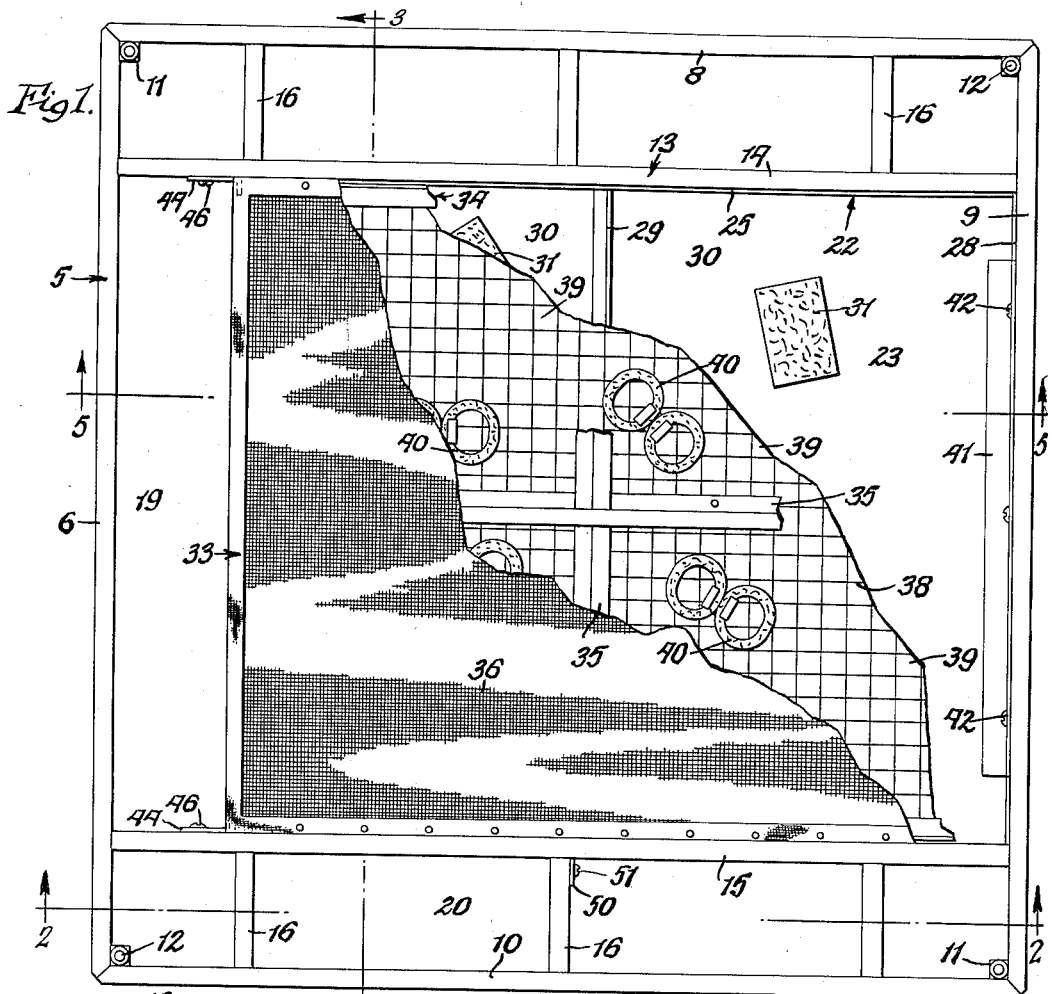
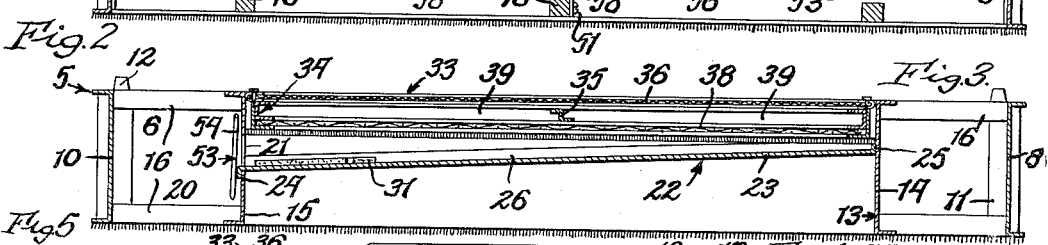
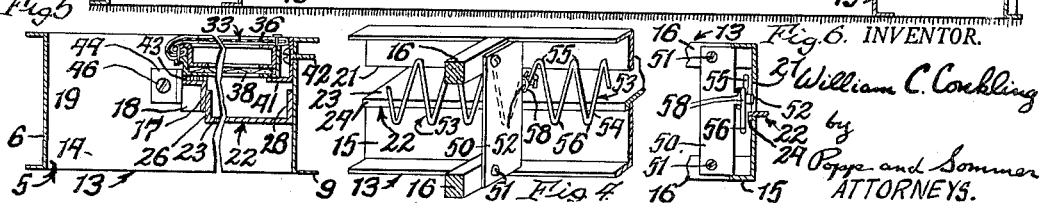
INVENTOR.
William C. Conkling
by Pope and Sommer
ATTORNEYS.

United States Patent Office 2,723,752
Patented Nov. 15, 1955

2,723,752

RETAINER FOR PAN CLEANERS IN SIEVES

William C. Conkling, Lockport, N. Y., assignor to Richmond Manufacturing Company, Lockport, N. Y., a corporation of New York Application April 24, 1951, Serial No. 222,661

6 Claims. (Cl. 209—323)

This invention relates to a retainer for the pan cleaners in each sieve of a stack of sieves used in gyrating or reciprocating shake sifters or bolting equipment to keep the pans below each screen polished and to dislodge any material tending to accumulate on the pan. The retainer of the present invention retains the pan cleaners on the pan while permitting the throughs to pass to the vertical throughs channels provided by the stacks of sieves.

One of the objects of the invention is to provide a pan cleaner retainer which increases the activity of the pan cleaner with less wear of the pan cleaner.

Another object is to provide such a pan cleaner retainer which provides a minimum obstruction of the vertical throughs channel of the stack of sieves and into which the throughs are discharged from the pans, such minimum obstruction permitting the vertical throughs channel to be readily kept clean by passing a brush through the same and without interference from the pan cleaner retainers.

Another object is to provide such a pan cleaner retainer which is itself self cleaning because of its inherent flexibility in action.

Another aim is to provide such a pan cleaner retainer which is very simple and inexpensive and easy to install.

Another purpose is to provide such a pan cleaner retainer which is composed of a minimum of parts which are capable of becoming dislodged to go through with the product.

Another object is to provide such a pan cleaner retainer which will not rattle in use in gyrating or reciprocating sifters.

Other objects and advantages of the invention will be apparent from the following description and accompanying drawings in which:

Fig. 1 is a top plan view of a sieve for a gyrating or reciprocating shake sifter equipped with a pan cleaner retainer embodying the present invention, parts being broken away to better disclose the construction.

Fig. 2 is a vertical sectional view through the vertical throughs channel of the sieve shown in Fig. 1, this section being taken on line 2—2, Fig. 1.

Fig. 3 is a vertical sectional view taken on line 3—3, Fig. 1.

Fig. 4 is a fragmentary perspective view from the central part of the vertical throughs channel of the pan cleaner retainer embodying the present invention.

Fig. 5 is a vertical sectional view through the sieve with the center portion of the same broken away, this section being taken on line 5—5, Fig. 1.

Fig. 6 is a fragmentary side elevational view of the anchoring plate for the pan cleaner retainer shown in Fig. 4 with associated parts being shown partly in section, this view being taken from the right of Fig. 4.

The invention is shown as embodied in a metal sieve although the invention is equally applicable to wooden sieves. The sieve is shown as comprising an outer rectangular metal frame 5 composed of four horizontal metal channels 6, 8, 9 and 10 which have their ends welded together and are arranged with their longitudinal edge flanges projecting outwardly. A vertical metal stem or block 11 is welded in each corner of the outer sieve frame 5, each having an upwardly projecting pin 12 adapted to fit in a socket (not shown) at the bottom of the corresponding stem or block 11 of the next succeeding higher sieve to insure proper register of all of the sieves in a stack of such sieves.

The inner rectangular metal frame 13 of the sieve is shown as comprising a pair of horizontal metal channel bars 14 and 15 each welded at its opposite ends to the inner faces of the channel bars 6 and 9 of the rectangular outer frame and in spaced relation to the corresponding outer frame channel bars 8 and 10, respectively. These metal channel bars 14 and 15 of the inner sieve frame are arranged with their longitudinal edge flanges projecting outwardly and are held in spaced relation to the corresponding channel bars 8 and 10 by a plurality of short horizontal spacer bars 16. A horizontal metal angle bar 17 is provided at its ends with ears 18 which in turn are welded to the opposing faces of the channel bars 14 and 15 of the inner sieve frame as best shown in Fig. 5 in spaced relation to the channel bar 6. This angle bar 17 forms, with the channel bars 6, 14 and 15, a vertical overs opening 19 through which the oversize material or overs rejected by the screen escape. The throughs or material passing through the screen escape through the vertical throughs channel 20 formed by the channel bars 10, 15, 6 and 9.

The pan cleaner retainer forming the subject of the present invention is arranged in this vertical throughs channel 20 and across a horizontal central rectangular opening 21 in the channel bar 15 and through which the throughs are directed by an inclined pan 22. This pan comprises a rectangular bottom 23 which slopes downwardly toward the opening 21 and is provided with a downwardly projecting lip 24 which overhangs the lower edge of this opening 21 in the channel bar 15. The opposite edge of this inclined pan 22 is bent upwardly to provide an upwardly directed flange 25 which can be welded to the face of the channel bar 14. The inclined pan 22 is likewise provided with upwardly directed side flanges 26 and 28 which are welded to the inner or opposing faces of the angle bar 17 and channel bar 9, respectively. This pan can also be reinforced by a central angle bar 29 which is welded to its upper face and extends down its incline toward the opening 21. This reinforcing cross bar 29 welded to the upper face of the pan 22 provides two chambers 30, 30 above the pan each of which contains a pan cleaner 31. These pan cleaners can be of any conventional form and are shown as being in the form of rectangular strips of leather.

The screen, indicated generally at 33, is preferably made in the manner shown in my Patent No. 2,677,462 for Sieves, dated May 4, 1954, and to which reference is made for a more detailed description of this screen. In general it consists of a rectangular metal frame 34 reinforced by internal cross bars 35, which are arranged at right angles to each other. This metal screen frame 34 has a piece of screen clothing, such as a bolting silk 36, secured to and extending over its upper side, and also has a coarse mesh screen 38 secured to and extending across its underside. The four compartments 39 in the screen formed by the rectangular frame 34, the cross bars, the clothing 36 and the coarse screen 38 each contains a screen cleaner which can be of any conventional form, such as the figure 8 leather screen cleaners 40 shown. These screen cleaners 40 are supported by the coarse screen 38 which acts as a screen cleaner carrier and these screen cleaners act against the underside of the bolting silk or clothing 36 as the sifter is gyrated or shaken to keep the clothing from binding and at uniform screening efficiency.

To mount the screen 33 is the sieve frame 5, a horizontal angle bar 41 is secured by screws 42 to the inner face of the channel bar 9, the corresponding side of the screen 33 resting on this angle bar, as best shown in Fig. 5. The opposite side of the screen 33 is similarly supported on the angle bar 17, a strip of plush 43 or other sealing material being preferably interposed between this angle bar 17 and the screen 33 to prevent escape of throughs from the adjacent chambers 30 to the overs opening 19. The screen 33 is held against the inner face of the channel bar 9 of the sieve frame by a pair of L-shaped ears 44 secured to the opposing faces of the channel bars 14 and 15 respectively by screws 46 or in any other suitable manner and arranged immediately above the cross angle bar 17. These ears 44 engage the corresponding corners of the screen 33 and hold it against the channel bar 9.

The present invention is concerned with a retainer for preventing passage of either of the pan cleaners 31 with the product through the opening 21 into the vertical throughs channel 20. To this end an anchoring plate 50 is secured in the vertical throughs channel 20 to be arranged transversely thereof and to be arranged centrally of the horizontally elongated opening 21. This anchoring plate is shown as secured by screws 51 to an upper and lower pair of the horizontal short spacer bars 16. The plate 50 has an ear 52 projecting toward and into the horizontally elongated opening 21.

The retainers, indicated generally at 53, are in the form of a pair of pieces of wire 54 each bent to provide a series of reverse bends providing an alternate series of upwardly and downwardly projecting loops, designated at 55 and 56, respectively, and these loops preferably lying in the same plane. The adjacent ends of the pair of wires are provided with eyes or hooks 58 which are caught over the ear 52 of the anchoring plate 50. The opposite end of each wire is formed to provide an eye or hook 59 which is secured by a screw 60 to the channel bar 15 of the inner frame 13 of the sieve at the corresponding outer end of the opening 21. The sinusoidal or looped parts of the wires 54 are in register with the opening 21 to prevent the escape of the pan cleaners 31 therethrough.

An important feature of the present invention resides in the non-rattling characteristics of the pan cleaner retainer 53 and which is achieved by forming its wire 54 with its loops 55 and 56 contracted and stretching this piece of wire in applying it to its ear 52 and screw 60. The sifter in which the sieves are mounted is subjected to high speed gyratory or reciprocating movement and rattling of the many pan cleaner retainers would create a highly undesirable noise level. Such noise is eliminated by the simple expedient of forming the loops 55 and 56 in a contracted state and stretching them when applied to the sieve.

In use, sieves as above described are built into a stack and secured on the platform of a gyrating or reciprocating shake sifter. This platform is rapidly gyrated or reciprocated in a horizontal plane as the material to be bolted or screened is fed to the upper surface and head end of each screen 33. The overs or oversize material rejected by the clothing 36 of the screen travel along the surface thereof and pass over the tail end thereof into the overs opening 19 usually falling onto the head end of the next lower screen 33 (not shown). The throughs or material passing through the clothing 36 pass through the coarse cleaner carrier wire 38 onto the inclined pan 22. The purpose of the coarse cleaner carrier wire 38 is to support the screen cleaners 40 which bounce up against the clothing 36 to keep its mesh open.

The pan 22 is kept polished and the throughs are prevented from lodging thereon by the pan cleaners 31 which are shown as being in the form of a leather rectangle. The throughs pass down this pan 22 and through the rectangular opening 21 in the cross channel bar 15 into the vertical throughs channel 20.

Without a barrier across this rectangular opening 21 the screen cleaners 31 would also go through this opening with the product. To avoid this the present invention provides the zig-zag pieces of wire 53, each secured at one end on the ear 52 of the central plate 50 and at its opposite end on a screw 60 in the cross channel bar 15. The loops of each of these wires are alternately directed upwardly and downwardly and lie in the same vertical plane and are at least equal to the height of the opening 21 so as to prevent the escape of the pan cleaners 31 through this opening. At the same time, since the detachable parts are only the wires 53 and the two screws 60, there are a minimum of parts which are in danger of becoming loose and going through with the product, especially as compared with the nails usually used. Further, because of the inherent springiness of the wires 53, an increased activity is imparted to the pan cleaners 31 as they strike these wires and it has also been found that the wear upon the pan cleaners 31 is much less on striking the resilient wires 53 as compared with the usual nails. The wires 53, especially as compared with the conventional nails, are simple and inexpensive to install and also provide a minimum obstruction of the vertical throughs channel 20. Also, by stretching the loops 55 and 56 in attaching the retainers in position, these retainers are rendered non-rattling even under the rapid motion of the sifter.

While the invention is shown as embodied in a wire having flat, oppositely directed loops 55 and 56 lying in the same plane, it will be understood that these loops could take other forms without departing from the spirit of the invention.

It will therefore be seen that the invention accomplishes the objectives set forth in a very simple and inexpensive manner.

I claim:

1. In a sieve for gyrating or reciprocating sifters and having horizontal frame members joined to provide an outer frame, additional horizontal frame members within and joined to said outer frame to provide an inner frame and a vertical throughs channel, an inclined pan within and supported by said inner frame and discharging from its lower end through a horizontally elongated opening in one of said inner frame members into said vertical throughs channel, and a pan cleaner on said pan, the combination therewith of means for retaining said pan cleaner on said pan, comprising a length of wire arranged adjacent said opening and having a series of reverse bends providing an alternate series of upwardly and downwardly projecting loops of an amplitude at least as great as the height of said opening, and means fastening the ends of said wire to said sieve in position to hold the looped portion thereof in register with said opening to prevent the escape of the pan cleaner therethrough.

2. In a sieve for gyrating or reciprocating sifters and having horizontal frame members joined to provide an outer frame, additional horizontal frame members within and joined to said outer frame to provide an inner frame and a vertical throughs channel, an inclined pan within and supported by said inner frame and discharging from its lower end through a horizontally elongated opening in one of said inner frame members into said vertical throughs channel, and a pan cleaner on said pan, the combination therewith of means for retaining said pan cleaner on said pan, comprising a length of wire arranged adjacent said opening and having a series of reverse bends providing an alternate series of upwardly and downwardly projecting loops of an amplitude at least as great as the height of said opening, eyes provided on the end extremities of said piece of wire, and means including at least one removable screw member fastening each of said eyes to said sieve in position to hold the looped portion thereof in register with said opening to prevent the escape of the pan cleaner therethrough.

3. In a sieve for gyrating or reciprocating sifters and having horizontal frame members joined to provide an outer frame, additional horizontal frame members within and joined to said outer frame to provide an inner frame and a vertical throughs channel, an inclined pan within and supported by said inner frame and discharging from its lower end through a horizontally elongated opening in one of said inner frame members into said vertical throughs channel, and a pan cleaner on said pan, the combination therewith of means for retaining said pan cleaner on said pan, comprising an anchoring member arranged adjacent said opening and secured to said sieve at the central part of said opening, an ear on said anchoring member and projecting toward said opening, a pair of wires arranged adjacent said opening and each having a series of reverse bends providing an alternate series of upwardly and downwardly projecting loops of an amplitude at least as great as the height of said opening, means arranged to fasten one end of each of said wires to said ear, and means arranged to fasten the opposite end of each of said wires to said one of said inner frame members at the corresponding end of said opening therein and in position to hold the looped portions of said wires in register with said opening to prevent the escape of said pan cleaner therethrough.

4. In a sieve for gyrating or reciprocating sifters and having horizontal frame members joined to provide an outer frame, additional horizontal frame members within and joined to said outer frame to provide an inner frame and a vertical throughs channel, an inclined pan within and supported by said inner frame and discharging from its lower end through a horizontally elongated opening in one of said inner frame members into said vertical throughs channel, and a pan cleaner on said pan, the combination therewith of means for retaining said pan cleaner on said pan, comprising an anchoring member arranged in said vertical throughs channel and secured to said sieve at the central part of said opening, an ear on said anchoring member and projecting toward said opening, a pair of wires arranged adjacent said opening and each having a series of reverse bends providing an alternate series of upwardly and downwardly projecting loops of an amplitude at least as great as the height of said opening, means arranged to fasten one end of each of said wires to said ear, and a screw member arranged to removably fasten the opposite end of each of said wires to said one of said inner frame members at the corresponding outer end of said opening therein and in position to hold the looped portions of said wires in register with said opening to prevent the escape of said pan cleaner therethrough.

5. In a sieve for gyrating or reciprocating sifters and having horizontal frame members joined to provide an outer frame, additional horizontal frame members within and joined to said outer frame to provide an inner frame and a vertical throughs channel, an inclined pan within and supported by said inner frame and discharging from its lower end through a horizontally elongated opening in one of said inner frame members into said vertical throughs channel, and a pan cleaner on said pan, the combination therewith of means for retaining said pan cleaner on said pan, comprising a vertical anchoring plate arranged transversely in said vertical throughs channel and secured to said sieve at the central part of said opening, an ear on said anchoring plate and projecting horizontally toward said opening, a pair of wires each having eyes at its opposite ends and each having a series of reverse bends arranged in the same vertical plane and providing a series of upwardly and downwardly projecting loops of an amplitude at least as great as the height of said opening, one eye of each of said wires being adapted to be fastened to said ear, and a screw member arranged to removably fasten the eye at the opposite end of each wire to said one of said inner frame members at the corresponding outer end of said opening therein and in position to hold the looped portions of said wires in register with said opening to prevent the escape of said pan cleaner therethrough.

6. In a sieve for gyrating or reciprocating sifters and having horizontal frame members joined to provide an outer frame, additional horizontal frame members within and joined to said outer frame to provide an inner frame and a vertical throughs channel, an inclined pan within and supported by said inner frame and discharging from its lower end through a horizontally elongated opening in one of said inner frame members into said vertical throughs channel, and a pan cleaner on said pan, the combination therewith of means for retaining said pan cleaner on said pan, comprising a length of wire arranged adjacent said opening channel and having a series of reverse bends providing an alternate series of upwardly and downwardly projecting loops of an amplitude at least as great as the height of said opening, and means fastening the ends of said wire to said sieve in position to hold the looped portion thereof in register with said opening to prevent the escape of the pan cleaner therethrough, said fastening means being spaced to hold said loops in a stretched condition.

References Cited in the file of this patent

UNITED STATES PATENTS

| | | |
|---|---|---|
| 770,734 | Bonifield | Sept. 27, 1904 |
| 1,433,201 | Grant | Oct. 24, 1922 |
| 2,576,794 | Jost et al. | Nov. 27, 1951 |